J. S. EVANS.
FISHING HOOK.
APPLICATION FILED FEB. 4, 1918.

1,290,144.

Patented Jan. 7, 1919.

INVENTOR.
John Spencer Evans.
BY
ATTYS.

UNITED STATES PATENT OFFICE.

JOHN SPENCER EVANS, OF VICTORIA, BRITISH COLUMBIA, CANADA, ASSIGNOR TO THE CANADIAN FISH HOOK MANUFACTURING CO., OF VICTORIA, BRITISH COLUMBIA, CANADA.

FISHING-HOOK.

1,290,144.      Specification of Letters Patent.      Patented Jan. 7, 1919.

Application filed February 4, 1918. Serial No. 215,353.

*To all whom it may concern:*

Be it known that I, JOHN SPENCER EVANS, a citizen of the United States, and a resident of the city of Victoria, in the Province of British Columbia, Canada, have invented certain new and useful Improvements in Fishing-Hooks, of which the following is a specification.

My invention relates to improvements in fishing hooks, and the object of my invention is to provide a device having, in addition to the main hook, an auxiliary gripping hook adapted to be maintained in a normally inoperative position, but which, when the main hook is seized by a fish, will automatically operate and swing laterally away from the main hook so as to embed itself in the mouth of the fish on the opposite side to that in which the main hook is embedded, both hooks being then maintained in a spread gripping position, thereby obviating the chance of losing the fish on account of its being insecurely hooked, a frequent occurrence at the present time with the forms of hooks in common use.

I attain this object by the construction illustrated in the accompanying drawings in which—

Similar figures of reference indicate similar parts throughout the several views.

Figure 1:
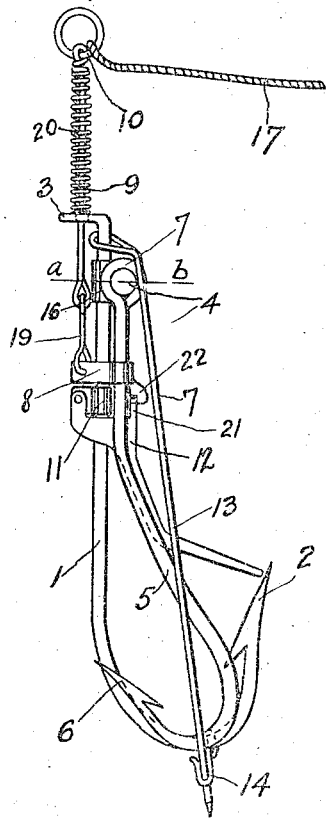
Figure 1 is a side view of the device showing the auxiliary hook in inoperative position.
Figure 2:
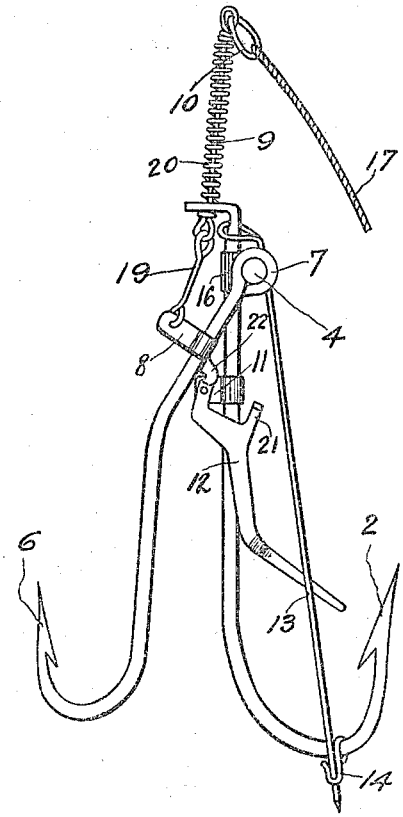
Fig. 2 is a side view showing the auxiliary hook in operative position.

1 indicates the main hook having the usual barb 2 and having its upper end turned over and formed as an eye 3. Pivotally mounted on a rivet 4 secured to the shank of the hook 1 at a suitable point thereon is an auxiliary hook 5 having the usual barb 6, the extremity of the shank of which hook is doubled over, as shown in Figs. 1 and 2, to form an eye 7 through which the rivet 4 passes. Rigidly secured to the shank of the hook 5 is a laterally extending arm 8 having connected thereto a link 19, to which link is connected a wire 9, which wire passes through the eye 3 of the main hook and is provided on its free end with a ring 10 to which is secured the fishing line 17. A spring 20 is mounted on the wire 9 between the eye 3 and the ring 10, being in compression when the device is set, as hereinafter described.

11 indicates a bracket rigidly secured to the shank of the main hook on which is swingably mounted an arm 12 provided with a finger 21 adapted to coöperate with a catch member 22 with which the auxiliary hook is provided and by means of which it is maintained in the inoperative position, as shown in Fig. 1, the free end or point of the arm 12 being then adjacent the barb 2 of the main hook.

13 indicates a wire member loosely connected at its upper end to the shank of the hook 1, its lower end being sharpened adapted for detachable engagement with a spring catch member 14 loosely mounted on the lower end of hook 1, the wire 13 and member 14 providing a suitable and convenient bait-securing means, as will be hereinafter mentioned.

Figure 3:
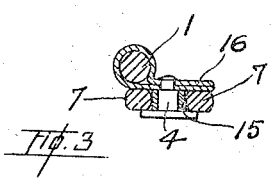
Fig. 3 is a cross section taken on the line *a—b* of Fig. 1.

The rivet 4 is preferably provided with a bushing of Babbitt metal, as indicated at 15 in Fig. 3, on which bushing the auxiliary hook swings, and the rivet itself is secured into a plate 16 fixed to the shank of hook 1 by any suitable means.

Having thus indicated the principal parts of my invention I will now describe its operation.

In preparing the device for fishing when using a fish, such as a herring, for bait, the wire 13 is disengaged from the catch 14 and the point of the wire is inserted into the mouth of the herring and pushed down to be passed out through the body of the same and reëngaged in the catch 14 after the manner of a safety pin, as it were, from which it will be seen that the herring bait is then securely attached to the device and arranged parallel with the same. The auxiliary hook 5 may now be set in the position shown in Fig. 1, the finger 21 of the arm 12 then engaging the catch 22 and being held in engagement therewith to maintain the auxiliary hook in the inoperative position by the spring 20.

On a fish striking and swallowing the bait the barb 2 will enter its mouth and the point of the arm 12 will be depressed, thus disengaging the finger 21 from the catch 22, whereupon the spring 20, extending, will cause the auxiliary hook to be swung sharply in a lateral direction away from the main hook, as shown in Fig. 2, and within the mouth of the fish so that its barb 6 will embed itself in the mouth of the fish directly opposite to the side in which the barb 2 is embedded, the tension of the spring then keeping the hook 5 spread and sinking both hooks deeply into the inside of the mouth so that the fish is securely held until the hooks are withdrawn for re-setting.

Figure 4:
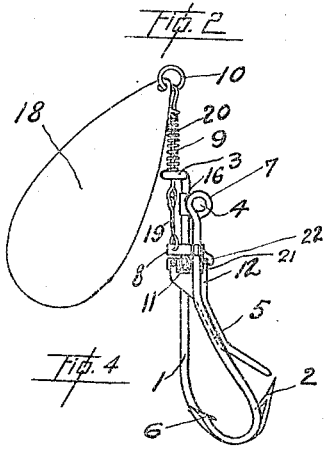
Fig. 4 is a view of the device showing the alternative spoon bait attachment.

When using the device with a spoon bait the wire 13 and catch 14 may be dispensed with, the bait, in spoon form, as indicated at 18 in Fig. 4, being then attached to the ring 10.

In addition to the advantage pointed out in the foregoing the device possesses other advantages, such as, for instance, that the point of the main hook need not necessarily start to enter the flesh in the mouth of the fish to operate the arm 12, as the pressure of the mouth thereon is sufficient to disengage the lock and allow the spreading action to take place, which action is then further assisted by the pull on the fishing line. Again, should the auxiliary hook become inadvertently detached, that is, spread, when in the water the utility of the device is not thereby altogether destroyed as it still retains the hooking possibilities of an ordinary single hook, with the added advantage that there are then two hooks on either of which a fish may be caught, the main hook and the auxiliary one, as will be readily understood from reference to Fig. 2. The arm 12 also acts as a guard to prevent floating grass and the like from accumulating on the hook, as is so often the case with ordinary hooks.

What I claim as my invention is:—

1. A device of the character described comprising, a main hook having the upper end of its shank formed as an eye and provided adjacent said eye with a pivot member, an auxiliary hook mounted on said pivot and detachably locked to the main hook, the said auxiliary hook having its barbed end arranged reverse to the barbed end of the main hook, a wire connected to the shank of the auxiliary hook extending through the eye of the main hook and having its free end adapted for attachment to a line, and a spring mounted on said wire above the eye of the main hook, said spring being under compression when the device is set.

2. A device of the character described comprising, a main hook having the upper end of its shank formed as an eye and provided adjacent said eye with a pivot member, an arm swingably mounted on the said main hook the free end of which extends adjacent the barb of the main hook, when the device is set, an auxiliary hook swingably mounted on the said pivot and having its barbed end arranged and lying in the same plane as the barbed end of the main hook, said auxiliary hook having a projection with which the upper end of the said arm engages whereby both hooks are detachably locked together, and a wire connected to the shank of the auxiliary hook extending through the eye of the main hook and having its upper end adapted for attachment to a line.

Dated at Victoria, B. C., this 19th day of January, 1918.

JOHN SPENCER EVANS.